Aug. 27, 1940. W. A. HART 2,212,737
MEANS FOR BROACHING GEARS
Filed April 13, 1936 2 Sheets-Sheet 2

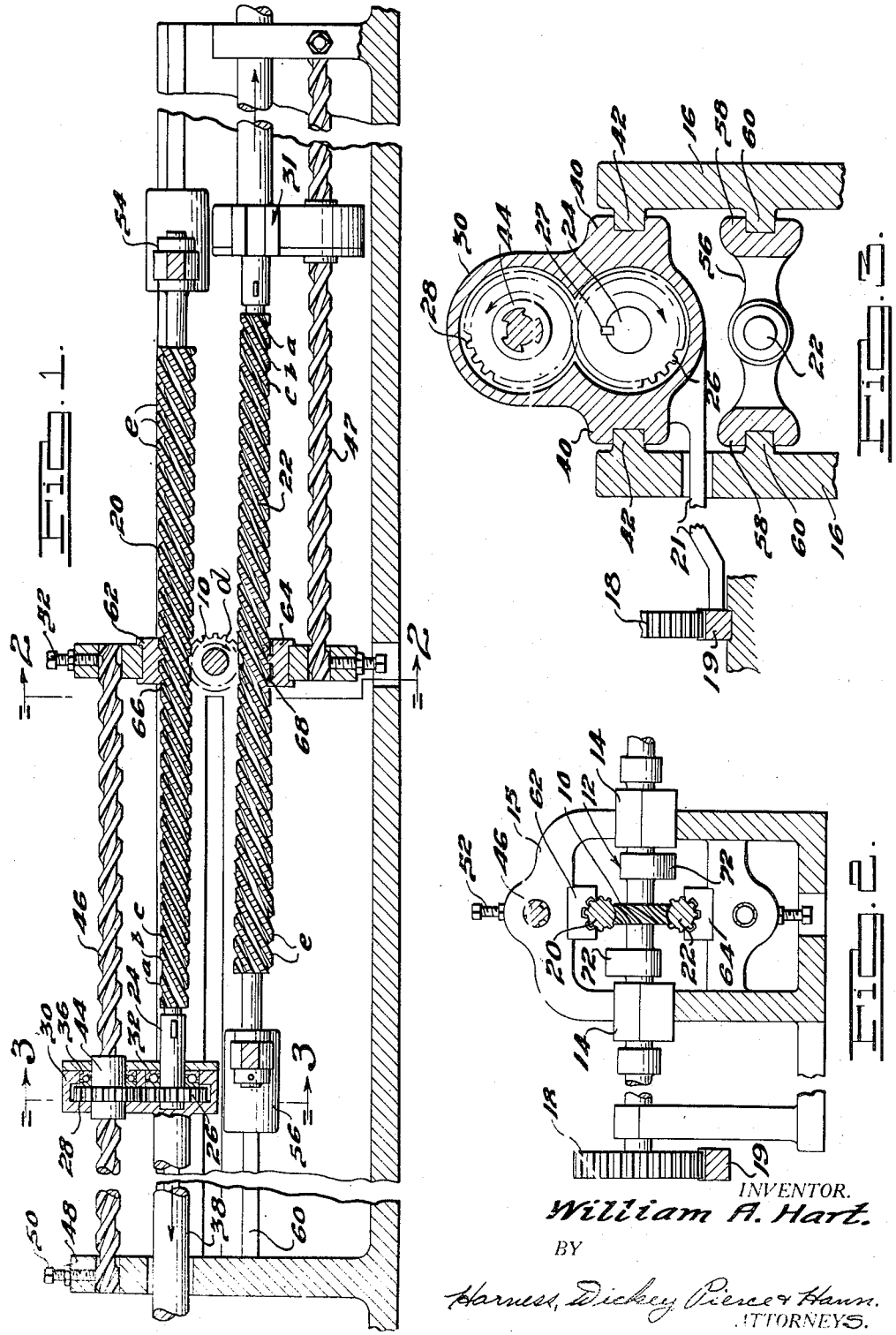

INVENTOR.
William A. Hart.
BY
Harness, Dickey, Pierce & Hann.
ATTORNEYS.

Patented Aug. 27, 1940

2,212,737

UNITED STATES PATENT OFFICE 2,212,737

MEANS FOR BROACHING GEARS

William A. Hart, Detroit, Mich., assignor to Colonial Broach Company, Detroit, Mich., a corporation of Michigan Application April 13, 1936, Serial No. 74,125

4 Claims. (Cl. 90—4)

The present invention relates to the formation of gears by broaching operations, and in particular provides an improved method of, and broaching machine for, manufacturing helical gears.

Objects of the present invention are to provide improved method of, and broaching machine for, forming gears, characterized as adapted to produce a completely formed gear from a gear blank in a single pass of a broaching tool relative to the gear blank; to provide such a method which may be economically practiced to provide a relatively high production rate; and to provide a machine for practicing the method which is economical of manufacture, simple in construction, and positive and accurate in operation.

Further objects of the present invention are to provide an improved method for broaching gears in accordance with one embodiment of which one or more broaching tools may be disposed axially perpendicular to the axis of the gear, the tool or tools may be simultaneously rotated and moved axially, and the gear may be rotated in timed relation to the axial and rotative movements of the broach or broaches; to provide such a method in accordance with another embodiment of which one or more broaches, having helically disposed cutting teeth, may be rotated and moved in axially parallel relation to the axis of the gear blank, the gear blank being rotated in timed relation to the axial and rotative movements of the broach or broaches.

Further objects of the present invention are to provide an improved broaching machine for broaching gears, embodying means to support a broaching tool having helically disposed teeth and a gear to be cut with their axes perpendicular to each other, and further embodying means to rotate the broaching tool and move it axially in timed relation to rotation of the gear; and to provide such a machine embodying means to support one or more broaches and a gear to be cut with their axes parallel, and further embodying means to effect timed rotation of the gear and of the broach or broaches, said rotation being in timed relation to an axial movement of each broach or broaches.

With the above and other objects in view which appear in the following description, preferred but illustrative embodiments of the present invention are shown in the accompanying drawings throughout the several views of which corresponding reference characters are used to designate corresponding parts and in which:

Figure 1 is a view in side elevation with certain of the parts shown in section of a broaching machine which may be used in the practice of the present invention;

Fig. 2 is a view in end elevation, taken along the line 2—2 of Figure 1;

Fig. 5 is a diagrammatic view illustrating a further modification of the present invention;

Figure 3:
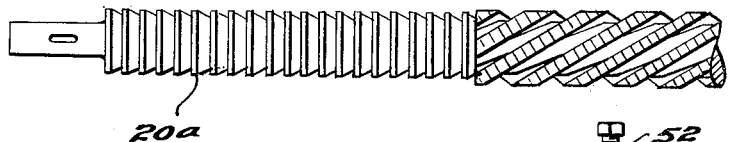
Fig. 3 is a view in vertical section taken along the line 3—3 of Fig. 1.

Referring first to Figures 1 to 3, the gear 10 to be cut is illustrated as forming an integral part of a cam shaft assembly 12, which assembly is rotatably supported in bearings 14 associated with a yoke 16 which may form a part of the machine frame. Gear 10 is adapted to be externally driven through a gear 18 which meshes with and is rotated by a rack 19 carried upon an arm 21 of adjustable length, which extends transversely from one of the broach pull heads 30.

The machine accommodates two similarly formed broaches 20 and 22, the tooth formations of which are discussed in more detail below and each of which is mounted for simultaneous rotative and axial movement. The supporting and operating mechanisms for the two broaches, while oppositely disposed, are similar, so that a description of one will be sufficient for both.

The leading end of broach 20 is pinned within a puller sleeve 24 to which a gear 26 is secured in driving relation, and which gear meshes with a similar gear 28. Gears 26 and 28 are rotatably journaled in the pull head 30, which forms a housing therefor. Gear 26 is provided with a ball ring 32, and a corresponding ball ring 36 is provided for gear 28.

Pull head 30 is provided with a forwardly extending pull bar member 38, which may be connected to an external source of power to effect linear movement thereof in any suitable way, and is provided with lateral guides 40 which cooperate with corresponding ways 42 formed in the main machine frame 16, to guide the movement of head 30 and consequently of the forward end of broach 20.

Gear 28 is drivingly connected to a sleeve 44, provided with one or more inwardly projecting tooth portions which cooperate with the threads of a spiral lead screw 46, the left hand end of which, as viewed in Figure 1, is adjustably supported in an upstanding column 48 associated with the frame and the right hand end of which is similarly adjustably secured in an opening formed in the machine frame 16. Set screws 50 and 52 are provided to lock the lead screw 46 in any desired rotative position.

With this arrangement, it will be appreciated that rectilinear movement of housing 30 draws sleeve 44 along lead screw 46, rendering the latter effective to rotate sleeve 44 and consequently to rotate broach 20 through gears 28 and 26, the rotative and rectilinear movements of broach 20 thus occurring in predetermined timed relation to each other. The pull head 31 and lead screw 47 associated with broach 22 cooperate to produce opposite linear and rotative movements to broach 22.

The right-hand end of broach 20, as viewed in Figure 1, is received in a guide yoke 54, which corresponds in all respects to the guide yoke 56 associated with broach 22, and which latter yoke is shown in section in Figure 3. Referring to Figure 3, yoke 56 extends between the frame members 16 and is provided with guides 58 which cooperate with corresponding rails 60 formed in the frame members 16. Yokes 54 and 56 thus act to maintain the following end of the associated broach at the same elevation as the leading end thereof.

Preferably and as illustrated, additional support for the broaches is provided at the points thereon which engage the gear 10 to be cut. As illustrated this is accomplished by providing blocks 62 and 64 which are provided with a plurality of tooth-like elements 66 and 68 which engage the associated broach in the spaces between the teeth thereof, and act to prevent, during the rotation of the broaches relative thereto, a change in the axial spacing between the broaches and the gear 10. It will be understood that although as hereinafter described, the broach teeth are of progressively increasing radius, the broach spaces between the teeth are of fixed diameter throughout the length of the broaches, so that the blocks 62 and 64 may remain at a fixed spacing from the axis of gear 10.

The teeth of each of broaches 20 and 22 are formed in a plurality of separate helices $a$, $b$, $c$, etc., the number of individual helices being dependent upon the total number of teeth to be cut in the gear 10. The lead of each helix $a$, $b$, or $c$, corresponds to the lead of the individual teeth $d$, which it is desired to cut in the gear 10. In a broad sense, accordingly, broaches 20 and 22 and gear 10 are related to each other in accordance with the relation between a hob and a gear in a conventional gear cutting assembly.

Continuing the broad analogy between the present arrangement and a hob and gear cutting assembly, it will be appreciated that in operation, a hob and gear are rotated in timed relation, at relative rates determined by the leads of the hob and gear teeth. In the present instance, the rotation of each broach is accompanied by an axial movement thereof relative to gear 10. Thus, the peripheral movement between each broach and gear 10 is made up of two components, one component being the axial broach movement and the other component being the rotative movement of gear 10. Accordingly, the actual rate of rotation of gear 10 bears a higher or a lower ratio to the rate of rotation of each broach than would obtain in the absence of the axial broach movement, the direction of axial movement determining whether the ratio is higher or lower. In the illustrated arrangement, the ratio is higher.

It will be appreciated that by reducing the axial component, the rotative component may be increased and that conversely by increasing the axial component the rotative component may be reduced. It will be further appreciated that the lower the axial component, the shorter the broach may be, but that, the shorter the broach, the greater must be the difference in radii of successive broach teeth. With these considerations in mind, the axial component is so proportioned as to permit the use of a broach which is not unduly long, but which is sufficiently long to permit formation thereon of teeth the depth of which does not increase unduly rapidly.

Preferably the teeth of the several helices of both broaches are respectively uniform, and the teeth in each helix of each broach increase in radius at a uniform rate from the leading end to a point suitably spaced from the following end. The final teeth of both broaches are of uniform radius, and are of a form and size corresponding to the form and size of the desired gear teeth. The teeth in advance of the final or finishing teeth are also preferably of the form of the desired gear teeth.

With reference to the operation of the machine as a whole, it will be understood that at the beginning of a cutting operation, the upper broach 20 occupies a position to the right of that shown in Figure 1, in which the left-hand-most teeth thereon are to the right of and free of the gear blank 10, and broach 22 occupies a corresponding position to the left of gear 10. Upon starting the machine, gear 10 is rotated at the previously identified predetermined rate in synchronism with a predetermined rate of axial movement of broach 20 to the left and a corresponding axial movement of broach 22 to the right, which axial movements are accompanied by timed rotative movements of the broaches thereof as effected by the lead screws associated therewith.

As broach 20 advances across the periphery of gear 10, the teeth in one of the helical rows is initially rendered effective to take a light cut, which cut, in view of the timed relative rotation and axial movement of the parts is disposed at the helix angle of the threads $d$ to be cut in the gear 10. During the period that such teeth are forming the initial cut, certain of the teeth in the adjacent row are brought into engagement with the periphery of gear 10 and initiate the cutting of the adjacent thread in the latter. Because of the axial movement of broach 20 which has taken place between the time of the beginning of the initial cut and the beginning of the second cut, the second cut is somewhat deeper than the initial cut. As the movement of the parts continues, successive teeth are formed in gear 10, each successive initial cuts of each successive tooth being somewhat deeper than the initial cut of the immediately preceding tooth. Corresponding cuts are taken by the successive teeth of broach 22.

After one-half complete revolution of gear 10, a predetermined number of equidistantly spaced initial cuts will have been taken therein, equal to the sum of the number of cuts taken by the teeth in each of the spiral rows of broach 20 plus those taken by broach 22. In certain cases the total number of cuts will be a whole multiple of the number of spiral rows of broach teeth, so that a particular cut in the gear will always be taken by the teeth in a particular spiral of one broach and by the teeth in a corresponding spiral of the other broach. In certain other instances, where the total number of teeth to be cut in gear 10 is other than a whole multiple of the number of spiral rows of teeth of the broaches, subsequent cuts in a gear tooth will be taken by the teeth in different spiral rows than the initial cut. The whole or other relation is, however, immaterial in the operation of the broaching machine, since all spiral rows of teeth are similarly formed, of similar lead, and of similarly increasing tooth radius.

Since substantial lengths of broaches 20 and 22 pass gear 10 between the time that a particular cut of a particular tooth in the latter is taken, and the time that the next successive cut in the same tooth is taken, it will be appreciated that such next cut will be substantially deeper than the particular cut. The progressive increase in tooth radius along the broaches is such that this increased depth of cut is within the operating limits of the broach and of the gear.

In view of the fact that during the broaching action, the respective teeth of gears 10 are cut to differing depths, as stated above, a need arises for equalizing the depth of the teeth as a finishing step. As illustrated, this is accomplished by providing the previously mentioned final groups of broach teeth e on each of broaches 20 and 22, which may be called finishing teeth, and all of which are of the same radius. The group of finishing teeth, which are of form and size corresponding to the form and size of the desired gear teeth, extend a distance equal or slightly in excess of that travelled by the broaches during a half revolution of gear 10 so that all gear teeth will be given a finishing cut thereby during the final passage of the broaches past the gear. Since all of the finishing teeth are of the same radius, it will be appreciated that the ultimate tooth depth in gear 10 will be uniform.

Figure 4:
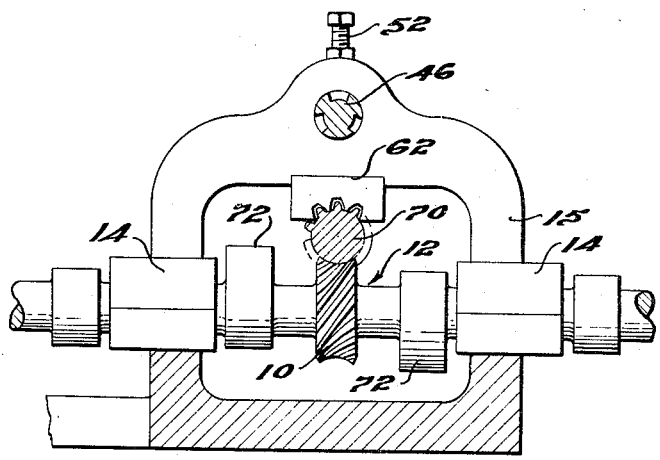
Fig. 4 is a view corresponding generally to Fig. 2, but illustrating a modified embodiment of the present invention.

Figure 4 illustrates a modified embodiment of the present invention, in which the lower broach 22 described with reference to Figure 1, is dispensed with, and the entire broaching action is effected by means of a single broach 70, the supporting and operating mechanism for which may be and preferably is as described with reference to Figure 1. The tooth formation of the single broach 70, when used in the embodiment of Figure 4, may also be as described for broaches 20 and 22 with reference to Figure 1, with the exception that, since the single broach is to perform the entire cutting action, the rate at which the successive teeth increase in radius will preferably be lower than the rate at which the corresponding teeth of the broaches 20 and 22 may increase. A longer broach is thus involved.

In further accordance with the present invention, provision may be made for initially cutting the gear blank 10 to predetermined outside diameter and preforming the concavity in the periphery thereof. Referring to Fig. 5, this may be accomplished in the operation of a machine of the type described with reference to Figures 1 and 4, by providing each of the broaches with a plurality of preliminary teeth 20a which extend in circular formation entirely around the periphery of the associated broach. Utilizing a broach of the construction shown in Figure 5, accordingly, the initial broach movements past the gear will result simply in a shaving of the periphery thereof to a desired outside diameter and the formation thereof, due to the circular formation of the teeth 20a, of an arcuate recess in the gear periphery. The remaining teeth etc. of the broach may be and preferably are arranged as previously described with reference to broaches 20, 22 and 70.

The embodiments described with reference to Figures 1 and 4 are particularly advantageous where the gear element to be operated upon forms a part of an assembly which does not admit of the use of broaches which are disposed with their axes parallel to the axis of the gear to be cut. As appears in Figures 2 and 4, the cams 72 of the cam shafts 12 of which the gear 10 forms a part, extend from the axis of the cam shaft a distance in excess of the radius of gear 10. Under these circumstances, any difficulty otherwise encountered by the presence of the cams 72 or other obstructing elements, are obviated by arranging the broaches with their axes perpendicular to the gear axis.

Figure 6:
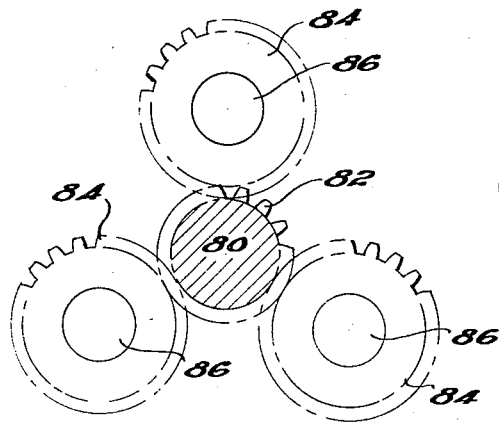
Fig. 6 is a diagrammatic view of a further modification of the present invention; and, Fig. 7 is a partial view of a broaching tool which may be used in the practice of the present invention.
Figure 7:
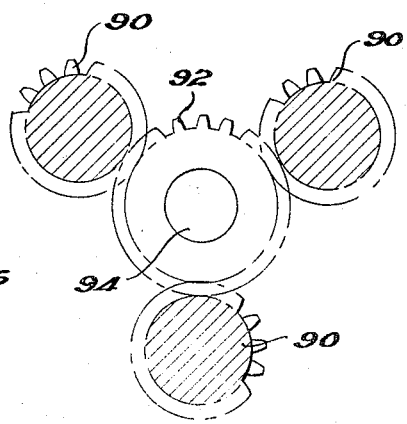

Figures 6 and 7 are diagrammatic views illustrating in a comparative manner embodiments of the present invention in which the gear and broach axes are disposed parallel to each other. In Figure 6 a single broach 80, having a plurality of rows of spirally disposed teeth 82 formed thereon of progressively increasing radius, followed by finishing teeth of uniform radius as in the case of the previously described broaches, is disposed for combined rotative and axial movements in cutting relation to a plurality of gears 84 suitably supported for rotation about shafts 86.

In this instance, the leads of the several helices on the broach exceed those of the helices on the previously described broaches 20, 22 and 70 by ninety degrees. The tooth forms correspond to the form of the teeth to be cut.

As in the previously described embodiments, gears 84 are rotated in timed relation to the axial and rotative movements of broach 80, the rate of rotation of gears 84 bearing a relation to the rate of rotation of broach 80 which is either higher or lower than the relation it would bear to a gear having the tooth lead of broach 80 by an amount determined by the rate and direction of axial movement of broach 80.

Fig. 7 illustrates an alternative arrangement in which a plurality of similarly formed broaches 90, the construction of which may correspond in all respects to the construction of the broach 80 with the exception that the teeth thereof will progress in radius at a greater rate than the teeth of the broach 80, are disposed for combined rotation and axial movement relative to a single gear 92, suitably disposed for rotation about the axis of a shaft 94 therefor.

Although specific embodiments of the present invention have been disclosed, it will be evident that various modifications in the form, number and arrangement of parts may be made therein within the spirit and scope thereof. It will also be appreciated that the improved method of the present invention is susceptible of practice in ways other than the specific ways herein described. The foregoing description, accordingly, is to be considered in an illustrative and not in a limiting sense.

What is claimed is:

1. In a machine for cutting gears, utilizing a tool having a plurality of helically arranged teeth of progressively increasing depth disposed on the outer surface thereof; the combination of means for supporting said gear in cutting relation to said tool; means for rotating said tool and for moving the same axially relative to said gear; means for supporting the ends of said tool during said movement, and additional means threadably engaging said tool in the spaces between said teeth for supporting said tool adjacent and diametrically opposite the point of engagement thereof with said gear.

2. A broaching machine for broaching gears comprising, in combination, a broach having a plurality of helically disposed teeth of progressively increasing depth; a draw head for effecting axial linear movement of said broach; means for supporting a gear to be broached with its periphery in cutting relation to said broach and for driving said gear in timed relation to said linear movement; and means including an element drivingly connected to said broach and actuated by said linear broach movement for effecting axial rotation of said broach in timed relation to said linear movement.

3. A broaching machine for broaching gears comprising, in combination, a broach having a plurality of helically disposed teeth of progressively increasing depth; a draw head for effecting axial linear movement of said broach; means for supporting a gear to be broached with its axis normal to the axis of said broach and with its periphery in cutting relation to said broach and for driving said gear in timed relation to said linear movement; and means including an element drivingly connected to said broach and actuated by said linear broach movement for effecting axial rotation of said broach in timed relation to said linear movement.

4. A broaching machine for broaching gears comprising, in combination, a broach having a plurality of helically disposed teeth of progressively increasing depth; a draw head for effecting axial linear movement of said broach; means for supporting a gear to be broached with its axis parallel to the axis of said broach and with its periphery in cutting relation to said broach and for driving said gear in timed relation to said linear movement; and means including an element drivingly connected to said broach and actuated by said linear broach movement for effecting axial rotation of said broach in timed relation to said linear movement.

WILLIAM A. HART.